Oct. 14, 1947.  E. C. COURNEY  2,428,961

VERTICALLY ADJUSTABLE BRIDGE MOUNTING FOR BIFOCAL LENSES

Filed Aug. 4, 1944

Earl C. Courney
INVENTOR.

BY
Victor J. Evans & Co.
ATTORNEYS

Patented Oct. 14, 1947

2,428,961

UNITED STATES PATENT OFFICE 2,428,961

VERTICALLY ADJUSTABLE BRIDGE MOUNTING FOR BIFOCAL LENSES

Earl C. Courney, Cleveland, Ohio

Application August 4, 1944, Serial No. 548,007

1 Claim. (Cl. 88—43)

The invention relates to eye glasses, and more especially to an adjustable bridge mounting for bifocal or trifocal lens eye glasses.

The primary object of the invention is the provision of a combined stop and actuating means for use with an adjustable mounting of this character, wherein the bifocal or trifocal lenses can be brought into working positions without the removal of the eye glasses from wearing position, the raising and lowering of the lenses being had in a novel manner and without any discomfort to a wearer during adjustment for such changed positions of the lenses.

Another object of the invention is the provision of a combined stop and actuating means for use with an adjustable mounting of this character, which will enhance the comfort of wearers of bifocal glasses, who use the lower part of their glasses for protracted periods, while doing close work, such as mechanics, bookkeepers, and others who have to carry an additional pair of glasses for such work, as they will be relieved from craning their necks backward whenever they look above the normal eye line or below and out at some object that requires the lower portion of the glasses for observation.

A further object of the invention is the provision of a combined stop and actuating means for use with an adjustable mounting of this character, wherein the construction thereof is unique and novel, in that the general appearance of the glasses is not detracted from or disturbed, the glasses being neat and attractive, the lens changing positions can be had with dispatch and ease, and means is provided for retaining the lenses in changed positions.

A still further object of the invention is the provision of a combined stop and actuating means for use with an adjustable mounting of this character, which is simple in construction, thoroughly reliable and efficient in operation, strong, durable, neat and attractive in appearance, readily and easily operated, and inexpensive to manufacture and install.

With these and other objects in view the invention consists in the features of construction, combination and arrangement of parts as will be hereinafter more fully described in detail, illustrated in the accompanying drawing, which shows the preferred embodiment of the invention, and pointed out in the claim hereunto appended.

In the accompanying drawing.

Similar reference characters indicate corresponding parts throughout the several views in the drawing.

Figure 1:
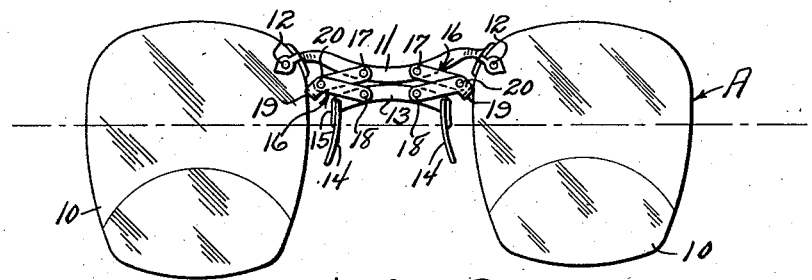
Figure 1 is a front elevation of eye glasses having the mounting constructed in accordance with the invention, and adjusted for distance vision.

Referring to the drawing in detail, A designates generally the eye glasses involving a pair of bifocal lenses 10 which may be of modern day construction, with the lower area thereof for close vision and the upper area for distance vision, as usual. These lenses 10 are rigidly held properly spaced apart by a downwardly curved bridge piece 11 arranged therebetween and having the end couplings 12 for the fastening of the lenses 10 therein to be fixedly held thereto.

Below the vertical center of the piece 11 is an upwardly arched nose saddling piece 13, which supports the nose pads 14, these being inset by elbows 15 formed from the piece 13, and are fixed in any suitable manner thereto.

Located between the pieces 11 and 13 are reverse laterally acting toggle or break-jointed links 16, which are spaced apart from each other and are pivoted to the piece 11 at 17, and pivoted to the piece 13 at 18, respectively, so that the piece 11 will rise and fall with relation to the piece 13 when worn upon the nose of a wearer of the glasses A, thereby shifting the lenses 10 of the latter with relation to the eye line of vision of such wearer to alternately bring the distance and close vision areas into working positions.

Figure 2:
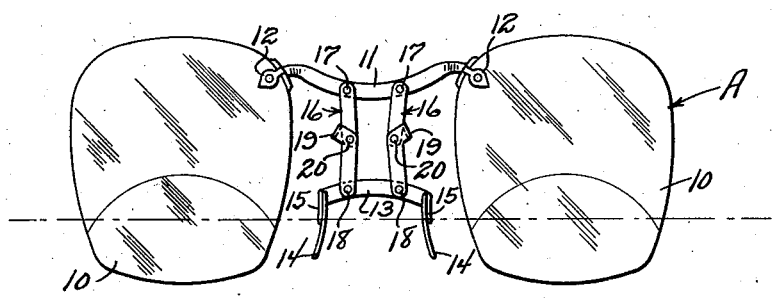
Figure 2 is a similar view showing the mounting adjusted for close vision.
Figure 3:
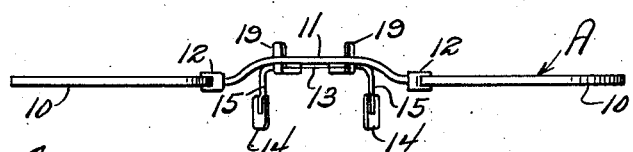
Figure 3 is a top plan view.
Figure 4:
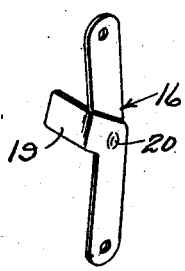
Figure 4 is a perspective view of the toggle link arrangement of the mounting.

The lowermost of the links 16 are provided with laterally off-set combined stop and finger-gripping ears 19 which, when the lenses are in raised position (Figure 2), will contact with the edges of the uppermost links 16 of the pairs pivoted together at 20 to prevent rotation of the upper links relative to the lower links. When the lenses are in the lowered position (Figure 1) these ears will contact with the edges next thereto of the said lenses, to prevent further downward movement thereof outwardly from the plane of the lenses, so that they can be manually engaged for extending or contracting the toggle links 16 for the adjustment of the mounting and regulating the positioning of the glasses before the eyes of a wearer.

When the toggle links 16 are actuated, they spread apart for the lowering of the glasses and for the raising action the said links in their spaced paired relation move toward each other crosswise with respect to the line of vision through the lenses when wearing the glasses, so that there is no outward or inward displacement of the latter away from or toward the eyes of such wearer, and thereby avoiding changing the foci in this respect. The toggle links 16 function as a raising and lowering prop for the bridge piece 11 with the result that the lenses move in a vertical direction when the glasses are being worn by a user.

What is claimed is:

A mounting for eye glases having lenses provided with superposed areas of different foci, comprising an upper bridge piece rigidly connected to said lenses, a nose-gripping piece, toggle acting means connecting such pieces together for moving the lenses to a raised or a lowered position in vertical relation to said nose piece to alternately bring the areas thereof in the line of vision of the eyes of a wearer, the lowermost links of said toggle acting means being provided at their upper ends with laterally offset finger engaging ears, said ears adapted to contact the uppermost links of said toggle acting means when the lenses are in raised position to prevent pivotal movement of said uppermost links relative to the lower links by the weight of said lenses when the same are in raised position and adapted to contact the edges of the lenses next thereto to prevent further downward movement of said toggle means by the weight of said lenses when the same are in a lowered position.

EARL C. COURNEY.

REFERENCES CITED

The following references are of record in the file of this patent:

UNITED STATES PATENTS

| Number | Name | Date |
| --- | --- | --- |
| 1,102,909 | Hanna | July 7, 1914 |
| 629,698 | Miller | July 25, 1899 |